(12) United States Patent
Hsu et al.

(10) Patent No.: US 7,345,866 B1
(45) Date of Patent: Mar. 18, 2008

(54) CONTINUOUSLY TUNABLE RF MEMS CAPACITOR WITH ULTRA-WIDE TUNING RANGE

(75) Inventors: Tsung-Yuan Hsu, Westlake Village, CA (US); David Chang, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 137 days.

(21) Appl. No.: 11/128,407

(22) Filed: May 13, 2005

(51) Int. Cl.
*H01G 5/00* (2006.01)

(52) U.S. Cl. .................. 361/277; 361/278; 361/283.1; 361/290; 361/291

(58) Field of Classification Search ........ 361/272–277, 361/278–280, 287–291, 283.1, 283.3; 324/661; 331/16, 34, 36
See application file for complete search history.

(56) References Cited

U.S. PATENT DOCUMENTS

| | | | |
|---|---|---|---|
| 5,640,133 A * | 6/1997 | MacDonald et al. ........ 333/197 |
| 6,212,056 B1 * | 4/2001 | Gammel et al. ............ 361/277 |
| 6,229,684 B1 * | 5/2001 | Cowen et al. .............. 361/278 |
| 6,355,534 B1 * | 3/2002 | Cheng et al. ............... 438/379 |
| 6,387,769 B2 * | 5/2002 | Dekker et al. ............. 438/379 |
| 6,441,449 B1 * | 8/2002 | Xu et al. .................... 257/414 |
| 6,507,475 B1 * | 1/2003 | Sun ............................ 361/281 |
| 6,803,774 B2 * | 10/2004 | Park ........................... 324/661 |
| 6,962,832 B2 * | 11/2005 | Chou ........................... 438/52 |
| 7,141,989 B1 * | 11/2006 | Liu ............................ 324/661 |

* cited by examiner

*Primary Examiner*—Nguyen T. Ha
(74) *Attorney, Agent, or Firm*—Christie, Parker, Hale

(57) ABSTRACT

A method is provided of continuously varying the capacitance of a MEMS varactor having a cantilever assembly mounted on a base portion, the cantilever assembly having a first capacitance plate and a dielectric element mounted thereon, and the base portion having a second capacitance plate mounted thereon. The method includes applying a first actuation voltage to deform the cantilever assembly until the dielectric element contacts the second capacitance plate leaving a gap therebetween, and applying a second actuation voltage larger than the first actuation voltage to further deform the cantilever assembly to reduce the gap between the dielectric element and the second capacitance plate.

19 Claims, 5 Drawing Sheets

CONTINUOUSLY TUNABLE RF MEMS CAPACITOR WITH ULTRA-WIDE TUNING RANGE

FIELD OF THE INVENTION

This invention relates to trimmable and continuously tunable capacitors and more specifically to a tunable-trimmable Micro Electro-Mechanical System ("MEMS") capacitor having an ultra-wide tuning range.

BACKGROUND OF THE INVENTION

Tunable capacitors are widely employed in radio frequency ("RF") communication applications as low noise parametric amplifiers, harmonic frequency generators, frequency controllers such as voltage-controlled oscillators, filters and tunable high impedance surfaces. Various devices would benefit from tunable capacitors or varactors having a wide tuning range, low loss and a low power consumption. A useful varactor should also be capable of being monolithically integrated in the device in which it is employed.

Typically, solid-state varactors are employed where tunable capacitance is required. However, solid-state varactors provide a very limited tuning range, usually in the range of 300-400%, have a high resistive loss and relatively high power consumption. In a solid state varactor diode used to provide a tunable capacitor, the varactor's capacitance is set by a bias current generated by a sub-circuit that can consume a significant amount of steady state power. Furthermore, the signal current applied to a solid-state varactor may tend to affect the capacitance, thus inducing some measure of error.

To avoid these problems, a MEMS varactor may be used in the place of solid-state varactors. MEMS devices are the microscopic equivalent of air-spaced variable/switchable varactors, and can be integrated into silicon chips using conventional wafer fabrication processes. Compared to varactor diodes, these devices are amenable to monolithic integration in a standard electronic circuit process without sacrificing performance.

The materials and fabrication techniques used to create a MEMS device include standard integrated circuit manufacturing materials and techniques. For example, MEMS devices may be fabricated by the under-etching of an area of a silicon chip's top metal layer to create a microscopic metal beam. Specifically, the MEMS varactor structures can be fabricated using a silicon on insulator ("SOI") technology in which the top silicon is etched to define the varactor structures, a deposition layer is patterned to form a mechanical coupler, and then subjected to a front side hydrofluoric acid etch to partially remove the silicon dioxide to form the suspended varactor structure.

Alternately, the MEMS varactor structures can be fabricated using a higher performance but more expensive SOI technology in which the top silicon, silicon dioxide or a deposited insulator layer is etched to define the mechanical coupler and the backside is dry etched to partially remove the substrate to suspend the mechanical coupler and the two electrically isolated capacitor plates. These and other techniques of fabrication will be known to those skilled in the art.

Previous RF MEMS tunable varactors have employed a gap tuning design, wherein the two plates of the varactor are suspended apart from one another, for example on the aforementioned microscopic metal beam and on the base of the device. A set of actuation electrodes pulls one plate closer to the other plate by deforming this microscopic metal beam through electrostatic attraction, thus changing the capacitance provided by these plates.

One of the forces intrinsic to MEMS variable varactors having an electrostatic attraction mechanism is the restoring force. The restoring force is a mechanical force that tends to return the cantilever assembly to its initial or rest position, i.e., the position of the cantilever assembly with no voltage potential across the actuation electrodes. When the voltage potential across the actuation electrodes is lessened or removed, the restoring force causes the cantilever assembly displacement to decrease as the cantilever assembly returns to its initial position, thereby varying the capacitance of the MEMS varactor.

However, known MEMS varactors suffer from the setback of a small tuning range (<3:1) due to a phenomenon known as the "snap down" effect. This effect causes the gap between the two plates of the varactor to close abruptly as the electrostatic attraction force provided by a pair of actuation electrodes exceeds the spring restoring force. As such, prior art devices have had to avoid bringing the two plates of the varactor within a minimum distance to prevent this effect, thus reducing the MEMS varactor's overall tuning range. Typically, prior art MEMS varactors have been limited to a tunable range defined by a deflection of no more than one third of the distance between the parallel plates. These varactors employ a region of small deflection of the microscopic metal beam or other device on which one of the varactor's plates is mounted resulting in a continuously variable capacitance-versus-voltage characteristic for the varactor.

Once spacing is decreased by more than one third, the snap down phenomenon takes effect and the formerly free end of the microscopic metal beam makes contact with the base of the device. In prior art devices, this has happened and the device is in snap down mode, it is assumed that the maximum capacitance has been reached for the device. Because of the snap down effect, prior art MEMS varactors have often been employed as bi-stable devices, rather than as true varactors continuously tunable over a full range of capacitances.

An explanation of the snap down effect and its limit on the tuning ranges of conventional varactors is included in the description of a MEMS varactor developed by Young and Boser in "A Micromachined Variable Capacitor for Monolithic Low-Noise VCOS," Tech. Digest of Solid State Sensors and Actuator Workshop, Hilton Head, S.C., Jun. 2-6, 1996, pp. 124-127. Another example of a conventional MEMS tunable varactor is disclosed by Change et al. in U.S. Pat. No. 5,959,516. Other known MEMS varactors exist offering a slightly improved tuning range (3-4:1), but at the cost of greatly increased power consumption. What is needed is an RF MEMS tunable varactor with a tuning ratio of over 40:1 which maintains the feature of ultra low power consumption (<<1 mW).

SUMMARY OF THE INVENTION

The present continuously tunable RF MEMS varactor features a tunable range of over 4000%. The varactor's innovative design allows for continuous adjustment of the gap between the two plates of the varactor from a maximum distance to zero by electrostatic attraction. The continuous tuning range of prior art, electrostatically actuated, two parallel-electrode systems is limited by the abrupt closing of the air gap occurring as the electrostatic force exceeds the spring force of the beam. However, with the present varactor, by incorporating spring linkages in the cantilever assembly, and by providing a dielectric element to act as a second anchor for the cantilever assembly, the actuation voltage can be increased to well above that necessary to initiate the snap down effect, without sacrificing the continuous tuning range of the varactor.

A method is provided of continuously varying the capacitance of a MEMS varactor having a cantilever assembly mounted on a base portion, the cantilever assembly having a first capacitance plate and a dielectric element mounted thereon, and the base portion having a second capacitance plate mounted thereon. The method includes applying a first actuation voltage to deform the cantilever assembly until the dielectric element contacts the second capacitance plate leaving a gap therebetween, and applying a second actuation voltage larger than the first actuation voltage to further deform the cantilever assembly to reduce the gap between the dielectric element and the second capacitance plate.

In an alternative embodiment of the present invention, the cantilever assembly is a rigid, non-deforming member with the exception of one or more spring portions included therein. In another alternative embodiment, the application of the second actuation voltage causes the cantilever assembly to deform under a three-point load. In a further alternative embodiment, the method further includes applying a third actuation voltage larger than either of the first or second actuation voltages to further deform the cantilever assembly and eliminate the gap between the dielectric element and the second capacitance plate.

DETAILED DESCRIPTION OF THE INVENTION

Figure 1:
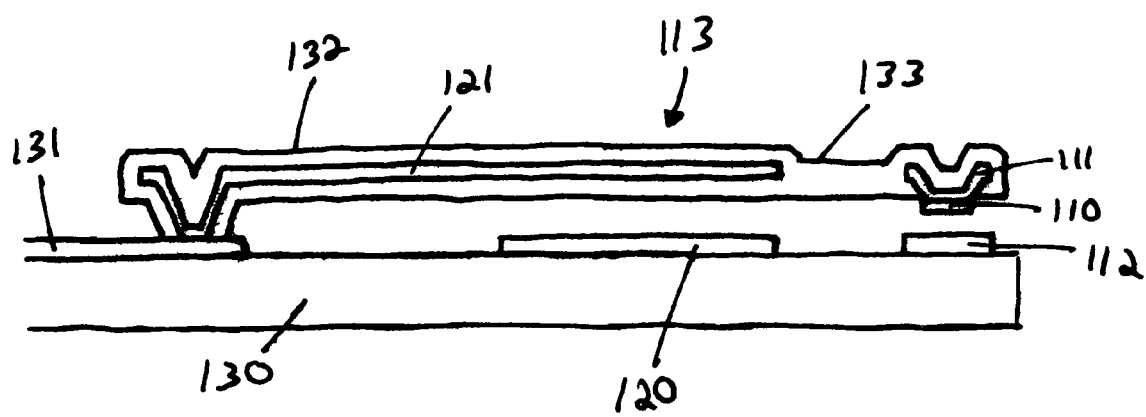
FIG. 1 shows a cross-sectional view of the present continuously tunable MEMS capacitor.

FIG. 1 shows a cross-sectional view of an embodiment of the present varactor having a base portion 130 supporting a mounting portion 131, a first actuation electrode 120 and an RF line electrode 112. The mounting portion 131 in turn serves to support a cantilever assembly 113. The cantilever assembly 113 includes a dimple 111 positioned at the free end of the cantilever assembly 113. This dimple 111 and the RF line electrode 112 are designed to function together as a pair of capacitance plates.

A second actuation electrode 121 is included in the cantilever assembly 113 which, when used together with the first actuation electrode 120, allows the cantilever assembly 113 to be pulled towards the base portion 130. The strength of the pull is dependent on the voltage applied across the first and second actuation electrodes. In the varactor shown in FIG. 1, a control circuit (not shown) applies a voltage $V_c$ across the varactor's first and second actuation electrodes generating an electrostatic force pulling the cantilever assembly 113 towards the base portion 130 against the natural spring force of the deformed cantilever assembly until the opposing spring and electrostatic forces reach equilibrium. When the voltage is reduced, the spring force of the cantilever assembly 113 pulls itself and the second actuation electrode 121 away from the base portion 130 until an equilibrium of opposing forces is reestablished.

The capacitance value of the varactor is based in part on the distance between the two capacitance plates, i.e. the RF line electrode 112 and the dimple 111. Because these are mounted on the cantilever assembly 113, by varying the voltage $V_c$ across the actuation electrodes, the distance between the two capacitance plates is varied and with it the capacitance value of the varactor.

The electrostatic force $F_C$ created by the voltage $V_C$ between the first and second actuation electrodes is given by the equation $F_C=(\in_o AV_c^2)/(2x^2)$, where $\in_o$ is the permittivity in a vacuum, A is the surface area of the electrodes, and x is the distance between the electrodes.

For an equilibrium of forces to be maintained, this electrostatic force $F_C$ of must be equal to the spring force $F_S$ of the cantilever assembly 113. The spring force $F_S$ is given by the equation $F_S=-K_X(\Delta x)$, where $K_X$ is the spring constant of the cantilever assembly 113 and $\Delta x$ is the deflection of the assembly from its undeformed position. One or more spring portions may be included in the cantilever assembly 113 to provide this spring force, or the stiffness of the assembly itself may serve to do so. In the embodiment shown in FIG. 1, a first spring portion 133 and a second spring portion 132 are provided as part of the cantilever assembly 113.

One of the limitations of prior art MEMS varactors is reflected in this equilibrating relationship between the spring force $F_S$ and the electrostatic force $F_C$. As shown by the equations above, the spring force $F_S$ for the cantilever assembly 113 is linear with respect to the displacement. However, the electrostatic force $F_C$ is inversely proportional to the square of the difference between the original gap and the displacement. Therefore, as the voltage $V_C$ increases causing further displacement of the cantilever assembly 113, a point is reached at which $F_C$ dominates fully over $F_S$ resulting in the cantilever assembly collapsing to the fully closed or displaced position. Furthermore, when the actuation voltage is reduced, the cantilever assembly will remain fully deflected until $F_S$ can dominate $F_C$, at which point the cantilever assembly will spring back into the open position, causing an abrupt form of hysteresis. This is known as the "pull-in" or "snap down" effect. Prior art devices exist which, due to this effect, are either fairly limited in their tuning ranges because they never approaching their snap down limits, or are employed as two-state or bi-stable varactors.

FIG. 1 shows a dielectric 110 which serves as both a dielectric element for the varactor, and prevents contact between the dimple 111 and the RF line electrode 112 in the event of a "snap down" event. The addition of this dielectric layer to the end of the cantilever assembly 113 prevents a potential short circuit between the capacitance plates of the varactor. Furthermore, the dielectric 110 serves as a second anchor of the cantilever 113 to prevent the snap-down effect which would otherwise limit the tuning range of the present varactor. In one embodiment, the dielectric 110 of the varactor is a layer of silicon nitride, though the dielectric 110 can be constructed from any suitably non-conductive material to achieve the benefits of the present varactor.

A dielectric 110 is formed over the dimple 111 to eliminate the possibility of electrode/electrode fusion and to create a capacitance greater than that afforded by the dielectric constant of a mere air gap. The tuning range of the present varactor may be extended or reduced by changing its material parameters, for instance the material used to provide the dielectric 110.

Figure 2:
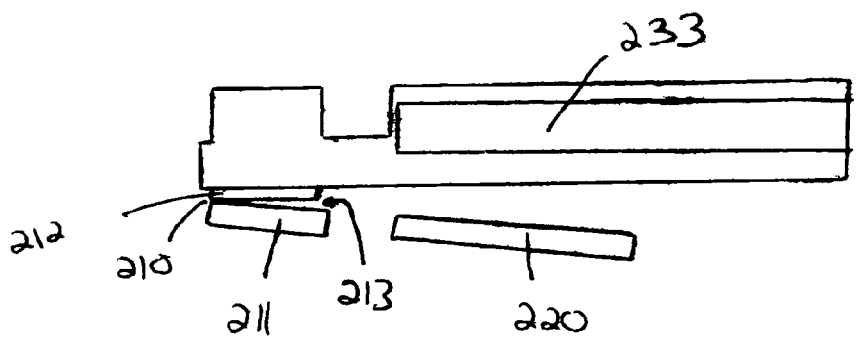
FIG. 2 shows a cross-sectional view of the present varactor wherein the dielectric has made partial contact with the RF line electrode.

FIG. 2 shows the present varactor after the cantilever assembly has been drawn close enough to the base portion so that the dielectric 210 has made contact with the RF line electrode 211. Because the dielectric 210 is composed of a dielectric material, capacitance is maintained between the dimple 212 and the RF line 211. After the snap down effect, the fixed-free beam provided by the cantilever assembly has become a fixed-fixed one. However, as shown in FIG. 2, a slight air gap 213 still exists between the dielectric 210 and the RF line electrode 211. As such, there is room for a further increase in the capacitance of the varactor.

Figure 6:
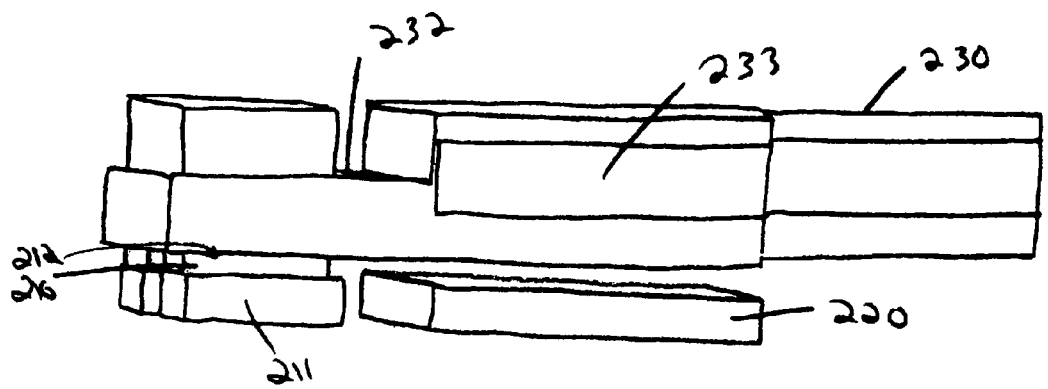
FIG. 6 shows a perspective view of the present varactor wherein the dielectric has made complete contact with the RF line electrode.

In FIG. 2, the dielectric 210 is not in complete contact with the RF line electrode 211 and therefore the maximum capacitance is not provided by the device. As will be shown in the following figures, the voltage across the actuation electrodes in this exemplary embodiment of the varactor can be increased all the way to 130 V in order to achieve the maximal capacitance (FIG. 6). Once the dielectric 210 has made contact with the RF line electrode 211 as shown in FIG. 2, because of the new boundary conditions and the ultra-stiffness of the cantilever assembly, the gap of the capacitance can now be continuously varied by adjusting the voltages across the actuation electrodes.

Figure 3:
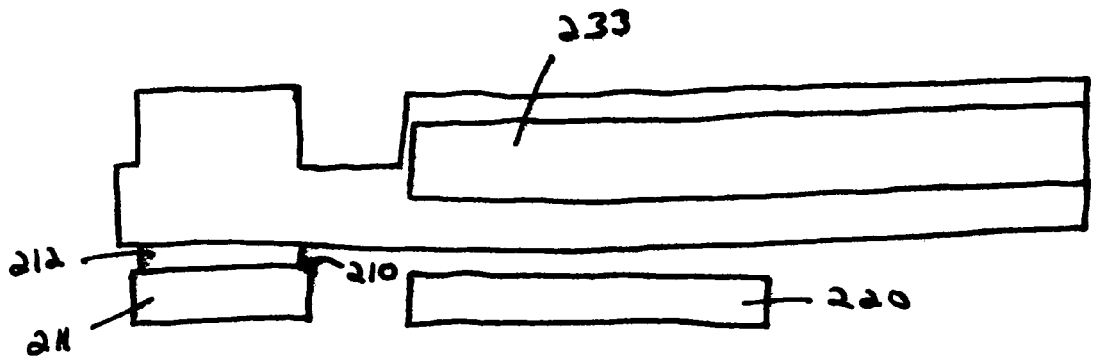
FIG. 3 shows a cross-sectional view of the present varactor wherein the dielectric has made complete contact with the RF line electrode.

In contrast, FIG. 3 shows an embodiment of the present varactor where the attraction between the actuation electrodes is even greater than in FIG. 2. The dielectric 210 is shown in contact with the RF line electrode 211. In the embodiment shown in FIG. 3, the capacitance of the varactor is at its maximum, given that the minimum distance (i.e. no air gap) exists between the dimple 212 and the RF line electrode 211. The maximum capacitance of the present varactor is obtained when the dielectric 210 is in conformal contact with the RF line electrode 211. FIGS. 1 and 3 thus show the extremes of the tuning range of the present varactor.

Figure 4:
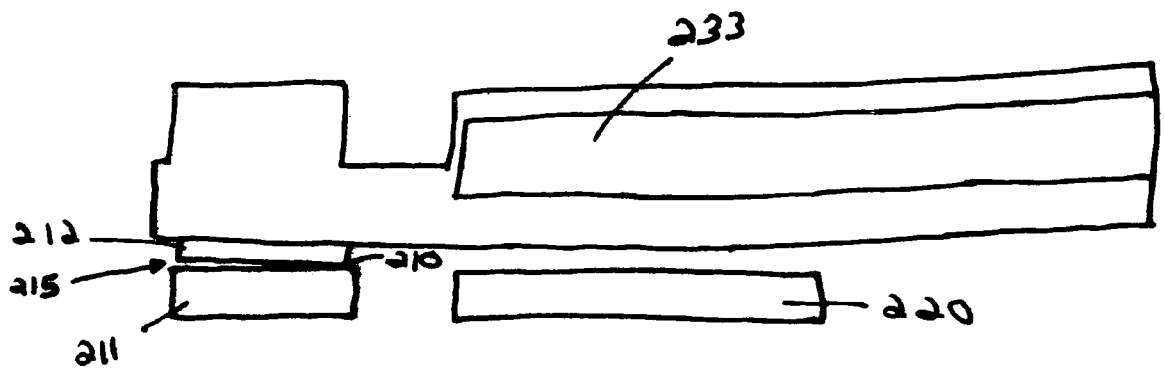
FIG. 4 shows the varactor of FIG. 3 wherein complete contact between the dimple and the RF line electrode has been lost due to a further increase in the voltage across the actuation electrodes.

FIG. 4 shows an embodiment of the preset varactor where the voltage across the actuation electrodes is increased past even the level of FIG. 3. As a result, the first and second actuation electrodes 220 and 233 continue to be pulled towards each other overextending and collapsing the cantilever assembly. As a result, the far edge of the dielectric 210 is pulled away from the RF line electrode 211 creating an air gap 215 and reducing the capacitance of the varactor from its maximum level. Thus, FIG. 4 shows an over-actuated embodiment of the present varactor where the capacitance value has fallen off from its maximum.

Figure 5:
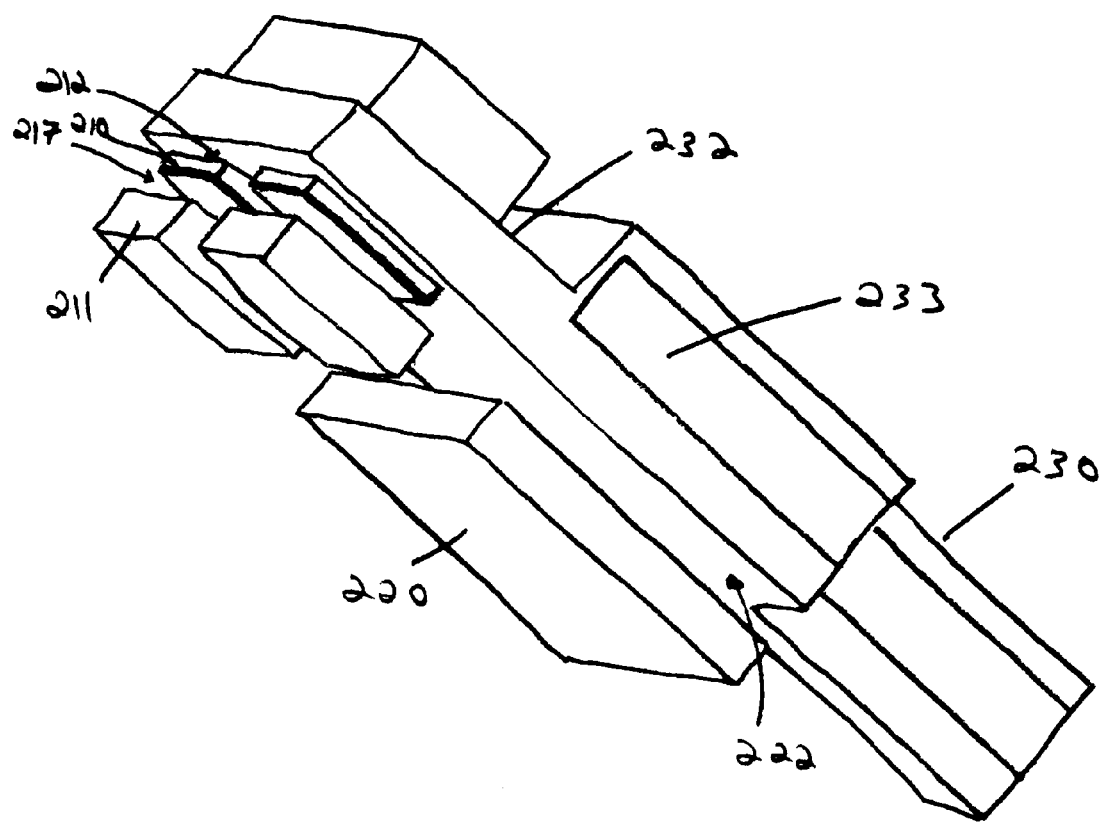
FIG. 5 shows a perspective view of the present varactor.

FIG. 5 shows a 3 dimensional view of the present varactor. The cantilever assembly of FIG. 5 is shown in the undeformed position. The capacitance of the varactor is measured based on the relationship between the dimple 212 having a dielectric 210 thereon and the RF line electrode 211. At zero actuation voltage applied across the first actuation electrode 220 and the second actuation electrode 233, the air gap 217 between the dimple 212 and the RF line electrode 211 is at its maximum. Therefore, the varactor establishes its lowest capacitance.

FIG. 6 shows a perspective view of the present varactor wherein the dielectric 210 has made complete contact with the RF line electrode 211. As such the shortest distance or "zero air gap" is provided between the capacitance plates of the varactor and the varactor establishes its highest capacitance.

Figure 7:
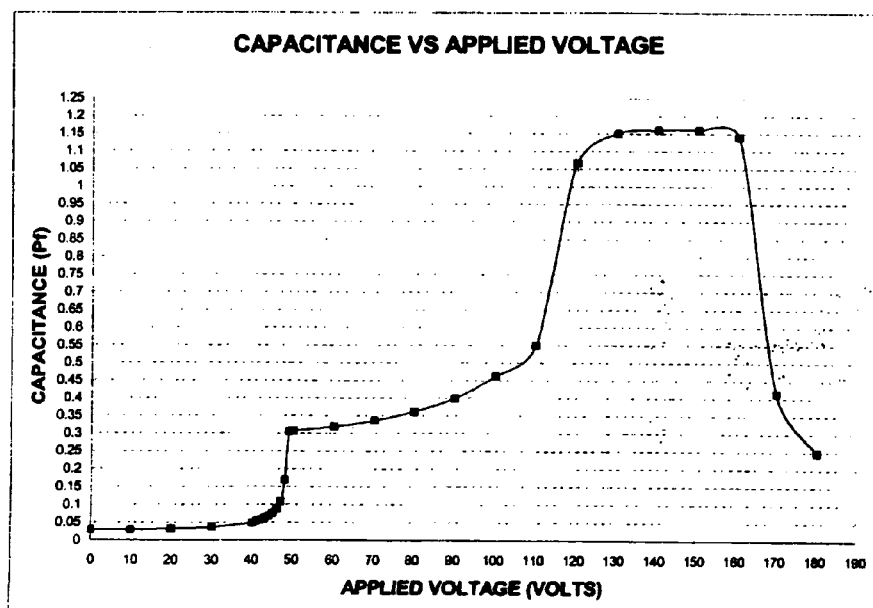
FIG. 7 is a diagram depicting the relationship between the capacitance of the present varactor and the voltage applied across the actuation electrodes of the present varactor.

FIG. 7 illustrates the capacitance to voltage relationship of the present varactor over a range of voltages. For example, the range of voltage signals from 0 to 130 volts produces a capacitance ranging from 0.025 to 1.15 pF. These voltages and capacitances are exemplary and may vary with dielectric material and other properties. In the graph of FIG. 7, a sharp knee is seen at 50 V, 0.3 pF due to the physical contact between the cantilever assembly and the base as the electrostatic attraction between the actuation electrodes begins to predominate, though does not completely overcome, the spring force of the cantilever assembly. Specifically, as the voltage applied to the first and second actuation electrodes approaches 50 V, the effective capacitance of the varactor rapidly increase firstly due to the fact that the displacement of the cantilever assembly with respect to the applied voltage is nonlinear, and secondly due to the fact that the gap between two electrodes consists of a air gap and a thin dielectric layer such as silicon nitride. The silicon nitride has a dielectric constant of 7.5 in comparison to 1 for the air. Since the air gap decreases as the applied voltage increases, the effective dielectric constant between the two electrodes approaches but does not yet reach 7.5, as the gap approaches but does not yet reach zero as the leading edge of the silicon nitride layer first contacts the RF line electrode 211. The slight diminution of the effective dielectric constant between the two electrodes below 7.5 is due to the slight air gap 213 which still exists at this point between the dielectric 210 and the RF line electrode 211, which air gap will be eliminated when the silicon nitride layer makes complete conformal contact with the RF line electrode rather than partial contact, which conformal contact is brought about by a substantially higher voltage than 50 V applied to the first and second actuation electrodes approaches. Thus, the rapid displacement of the electrodes towards each and resulting increase in the effective dielectric constant therebetween results in a sharp knee seen in FIG. 7 at 50 V.

At V=50 V, the far end of the dielectric contacts the RF line electrode. At V=130 V, the air gap between the dielectric and the RF line electrode is completely eliminated. As such, the dimple is in the closest possible proximity to the RF line electrode, and so the varactor is at its maximum capacitance. Even at V=160 V, the conformal contact between the dielectric and the RF line electrode is maintained.

In the embodiment shown, the actuation voltage $V_C$ can safely be increased up to 160 V without losing conformal contact between the dielectric and the RE line electrode (as has occurred in FIG. 7), and therefore in this range a continuously tunable varactor with a continuously increasing capacitance is provided. However, as the actuation voltage is further increased the cantilever assembly is pulled down further still to reveal a new gap between the dimples and the RF line electrode. At V>170 V, a new air gap 215 is formed due to further bending of the cantilever assembly, and the capacitance begins to reduce from its maximum value. The cantilever assembly will ultimately collapse if the voltage is increased beyond 170 V.

As shown in FIG. 7, the capacitance of the present varactor in one embodiment of the present invention can be varied from 0.025 pF to 1.15 pF for an enormously large tuning ratio of greater than 4000%. Taken in total, by employing the dielectric element to make the cantilever assembly function as a fixed-fixed beam a much greater tunable range can be provided by the varactor. By continuing to vary the actuation voltage and thus the capacitance to close the remaining air gap between the dielectric and the RF line electrode after the former and the latter have made contact, a much greater tuning range is possible than in prior art MEMS devices.

Figure 8:
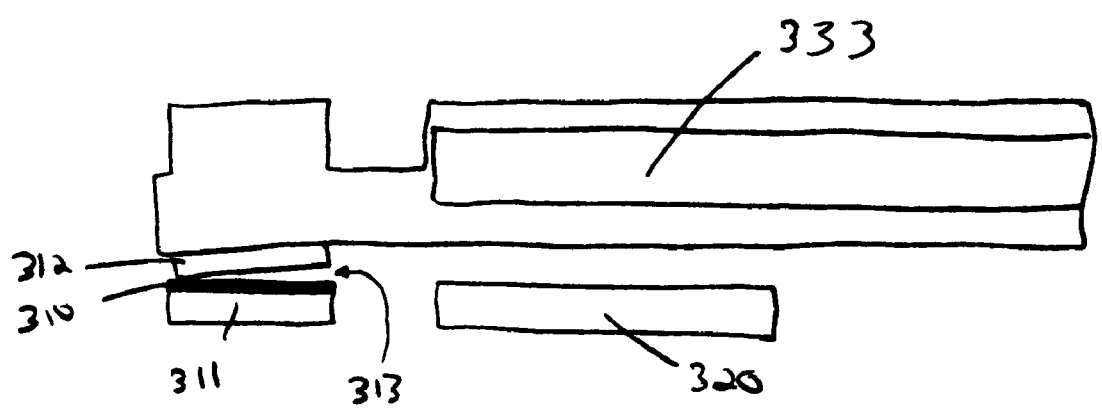
FIG. 8 shows a cross-sectional view of the present varactor wherein the dimple has made partial contact with the dielectric formed over the RF line electrode.

FIG. 8 shows a cross-sectional view of an alternative embodiment of the present varactor wherein the dielectric 310 is formed over the RF line electrode 311. The dimple 312 shown in FIG. 8 has made partial contact with the dielectric 310. A first actuation electrode 320 and second actuation electrode 333 are used to vary the gap between the RF line electrode 311 and the dimple 312.

In one embodiment, the varactor is fabricated using a process similar to that disclosed by Loo et al. in U.S. Pat. No. 6,046,659 the contents of which are incorporated herein by reference. As such, the varactor can be constructed using existing technologies without the need to develop a new fabrication process. The device may be fabricated on top of a silicon wafer using conventional deposition techniques. Both switches and varactors can be monolithically integrated in the same fabrication run.

What is claimed is:

1. A MEMS varactor comprising:
    a base portion including a first actuation electrode;
    a cantilever assembly mounted on the base portion, the cantilever assembly including a second actuation electrode;
    a first capacitance plate attached to the cantilever assembly;
    a second capacitance plate attached to the base portion; and
    a dielectric element disposed between the first capacitance plate and the second capacitance plate;
    wherein the cantilever assembly is deformable towards the base portion in response to a voltage difference between the first actuation electrode and the second actuation electrode resulting in a change in the distance between the first capacitance plate and the second capacitance plate.

2. The varactor of claim 1, wherein the dielectric element comes into partial contact with both the first capacitance plate and the second capacitance plate when the cantilever assembly is sufficiently deformed towards the base portion.

3. The varactor of claim 2, wherein the dielectric element comes into complete contact with both the first capacitance plate and the second capacitance plate when the cantilever assembly is sufficiently deformed towards the base portion.

4. The varactor of claim 2, wherein the cantilever assembly is further deformable after the point at which the dielectric element has come into partial contact with both the first capacitance plate and the second capacitance plate through the application of a three-point load.

5. The varactor of claim 1, wherein the cantilever assembly includes a rigid, non-deforming portion.

6. The varactor of claim 1, wherein the dielectric element is attached to the cantilever.

7. The varactor of claim 1, wherein the dielectric element is attached to the first capacitance plate.

8. The varactor of claim 1, wherein the dielectric element is attached to the base portion.

9. The varactor of claim 1, wherein the dielectric element is attached to the second capacitance plate.

10. The varactor of claim 1, wherein the dielectric element comprises silicon nitride.

11. A method of continuously varying the capacitance of a MEMS varactor, the method comprising:
    providing a MEMS varactor having a cantilever assembly mounted on a base portion, the cantilever assembly having a first capacitance plate and a dielectric element mounted thereon, and the base portion having a second capacitance plate mounted thereon;
    applying a first actuation voltage to deform the cantilever assembly until the dielectric element contacts the second capacitance plate leaving a gap therebetween; and
    applying a second actuation voltage larger than the first actuation voltage to further deform the cantilever assembly to reduce the gap between the dielectric element and the second capacitance plate.

12. The method of claim 11, wherein the cantilever assembly includes a rigid, non-deforming portion.

13. The method of claim 11, wherein applying the second actuation voltage causes the cantilever assembly to deform under a three-point load.

14. The method of claim 11, further comprising applying a third actuation voltage larger than either of the first or second actuation voltages to further deform the cantilever assembly and eliminate the gap between the dielectric element and the second capacitance plate.

15. The method of claim 14, wherein applying a third actuation voltage results in a conformal contact between the dielectric element and the second electrode.

16. The method of claim 14, wherein the third actuation voltage is applied across a pair of actuation electrodes disposed between the cantilever assembly and the base portion.

17. The method of claim 11, wherein applying a second actuation voltage results in a non-conformal contact between the dielectric element and the second electrode.

18. The method of claim 11, wherein the first actuation voltage and the second actuation voltage are applied across a pair of actuation electrodes disposed between the cantilever assembly and the base portion.

19. The method of claim 11, wherein the dielectric element comprise silicon nitride.

* * * * *